United States Patent [19]

Lelle et al.

[11] Patent Number: 5,619,131
[45] Date of Patent: Apr. 8, 1997

[54] PARALLEL ANALOG-DIGITAL MONITORING SYSTEM

[75] Inventors: Josef Lelle, Baden-Baden, Germany; Gerhard H. Ulrich, Sins, Switzerland

[73] Assignee: Landis & Gyr Business Support AG, Zug, Switzerland

[21] Appl. No.: 201,620

[22] Filed: Feb. 25, 1994

[30] Foreign Application Priority Data

Mar. 8, 1993 [CH] Switzerland ................... 693/93

[51] Int. Cl.$^6$ ........................................... G01P 3/48
[52] U.S. Cl. ............... 324/174; 324/160; 324/207.25; 324/207.2; 364/133; 364/187; 340/508; 318/563; 318/561
[58] Field of Search ........................... 324/161, 160, 324/163, 166, 168, 173–175, 207.2, 207.25, 207.12; 318/560–565, 609, 610; 415/13, 17, 16; 364/550–553, 133, 135, 180, 187, 160–165; 340/508; 371/11.1, 11.2

[56] References Cited

U.S. PATENT DOCUMENTS

| | | | |
|---|---|---|---|
| 3,709,626 | 1/1973 | Eggenberger | 415/17 |
| 3,832,635 | 8/1974 | Cass | 324/166 |
| 4,318,093 | 3/1982 | Wood et al. | 340/508 |
| 4,494,207 | 1/1985 | Chang et al. | 364/494 |
| 4,521,871 | 6/1985 | Galdun et al. | 364/900 |
| 4,587,470 | 5/1986 | Yamawaki | 318/564 |
| 4,641,517 | 2/1987 | Spock et al. | 364/551 X |
| 4,687,946 | 8/1987 | Jones | 364/494 |
| 4,808,933 | 2/1989 | Kobayashi et al. | 324/163 |
| 5,229,699 | 7/1993 | Chy et al. | 318/610 |

FOREIGN PATENT DOCUMENTS

| | | | |
|---|---|---|---|
| 0093276 | 11/1983 | European Pat. Off. | |
| 2502702 | 7/1975 | Germany | 340/508 |
| 3424247 | 1/1986 | Germany | |

OTHER PUBLICATIONS

Brochure: "Feuerungsautomaten für Öl–und Gasbrenner" by Landis & Gyr.

Primary Examiner—Sandra L. O'Shea
Assistant Examiner—J. Patidar
Attorney, Agent, or Firm—Meltzer, Lippe, Goldstein, et al.

[57] ABSTRACT

An electronic monitoring system provides an actual value sensor which detects an actual value of a component to be monitored, e.g., the rotational speed of a drive motor, and emits actual value signals, a signal path along which actual value signals are transmitted, and an evaluating unit connected to the signal path. The signal path is divided into two separate but parallel signal paths along which the actual value signals emitted by the actual value sensor are processed differently. For example, the actual value signals emitted by the actual value sensor may undergo digital signal processing along one path and analog signal processing along the other path. The actual value signals transmitted along the two paths are received by the evaluating unit which compares the signals and initiates appropriate steps if there are deviations between the two sets of actual value signals.

15 Claims, 6 Drawing Sheets

Fig. 5b $$n1 = \frac{1}{t/T} = \frac{T}{t} \qquad n2 = \frac{2}{t/T} = \frac{2T}{t}$$

$$\frac{n1}{n2} = \frac{1}{2}$$

PARALLEL ANALOG-DIGITAL MONITORING SYSTEM

BACKGROUND OF THE INVENTION

The instant invention relates to an electrical monitoring system which finds particular application in a fuel mixing device for burners of heating plants or similar installations.

A control system of this general type is described in the brochure "Feuerungsautomaten für Öl-Und Gasbrenner" of the company Landis & Gyr of Switzerland. In the case of small compact burners, the same drive mechanism is used for the air blower and for the oil pump, so that the shaft of the drive motor drives the oil pump as well as the blower. In order to ensure that the ratio between the quantity of air conveyed and the quantity of oil conveyed is controlled, an additional air valve and/or an additional control element for oil feed is provided.

Monitoring devices of the type mentioned initially serve, for instance, as a measuring system to ascertain and display the rotational speed of a drive aggregate, or as a regulatory system to compare the actual value of the rotational speed with a desired value in order to utilize deviations to control the rotational speed.

It is the object of the instant invention to improve a monitoring system of the type mentioned initially so that safety of operation is improved.

SUMMARY OF THE INVENTION

In accordance with the present invention, safety of operation is improved by, an electrical monitoring system which comprises an actual value sensor which detects an actual value of a component to be monitored, e.g., the rotational speed of a drive motor, and emits actual value signals, a signal path along which the actual value signals are transmitted, and an evaluating unit connected to the signal path. The signal path is divided into two separate but parallel signal paths along which the actual value signals emitted by the actual value sensor are processed differently. For example, the actual value signals emitted by the actual value sensor may undergo digital signal processing along one path and analog signal processing along the other path. The actual value signals produced along the two paths are received by the evaluating unit which compares the signals and initiates appropriate steps if there are deviations between the two sets of actual value signals.

It is preferred that digital signals be carried on one signal path while analog signals be carried on the other signal path, so that these signals may be monitored or evaluated with respect to each other in the evaluating unit whereby errors can be recognized and eliminated immediately to ensure the required safety. If, for instance, an electronic component malfunctions on one signal path, it is highly unlikely that the operation of components on the other, parallel signal path is affected unless the entire installation is shut down due to a power failure for example, and this can be ascertained easily by the monitoring system already provided. A change in one signal path enables the evaluating unit to ascertain a discrepancy between the two signals and an alarm can be triggered, the system can be shut down as a preventive measure, or a replacement component can be brought into action immediately.

A special embodiment of the invention is used as a control system for burners of heating plants or similar installations. This is important because an error in the mixing ratio between fuel and air could lead to exceeding the permissible limit values and even to burner instability and danger. In case of defective redundance, the system must be switched off because additional errors in the remaining signal path can no longer be recognized. The ACTUAL-value sensor senses the rotational speed of the drive aggregates of the blower on the one hand and of the oil pump on the other hand. These are then compared to DESIRED values and deviations are used to influence a regulating signal, thereby increasing or decreasing the rotational speed so that a control of the rotational speed takes place. It is recommended in this case that the drive aggregates be controlled as a function of the desired value deviations in a pulse-width modulated manner.

The ACTUAL rotational speeds are sensed in particular by means of Hall probes and the drive aggregates are regulated as a function of the output signals of such sensors which serve as ACTUAL-value sensors. In this manner the desired safety can be properly ensured.

A control system of this type is optimally adaptable to different burners and other aggregates. The blower can also be controlled or regulated separately from the oil pump with regard to its rated horsepower. When the drive is uncoupled, the blower and/or the oil pump can be switched on or off at different points in time, and this helps to save energy and reduce wear. During pre-ventilation (fuel valve still closed), the oil pump need not yet be running. The moment at which it is switched on may be selected after the applicable run-up time.

BRIEF DESCRIPTION OF THE DRAWINGS

Preferred embodiments of the invention will now be described by reference to the drawings, wherein.

DETAILED DESCRIPTION OF PREFERRED EMBODIMENTS

Figure 1:
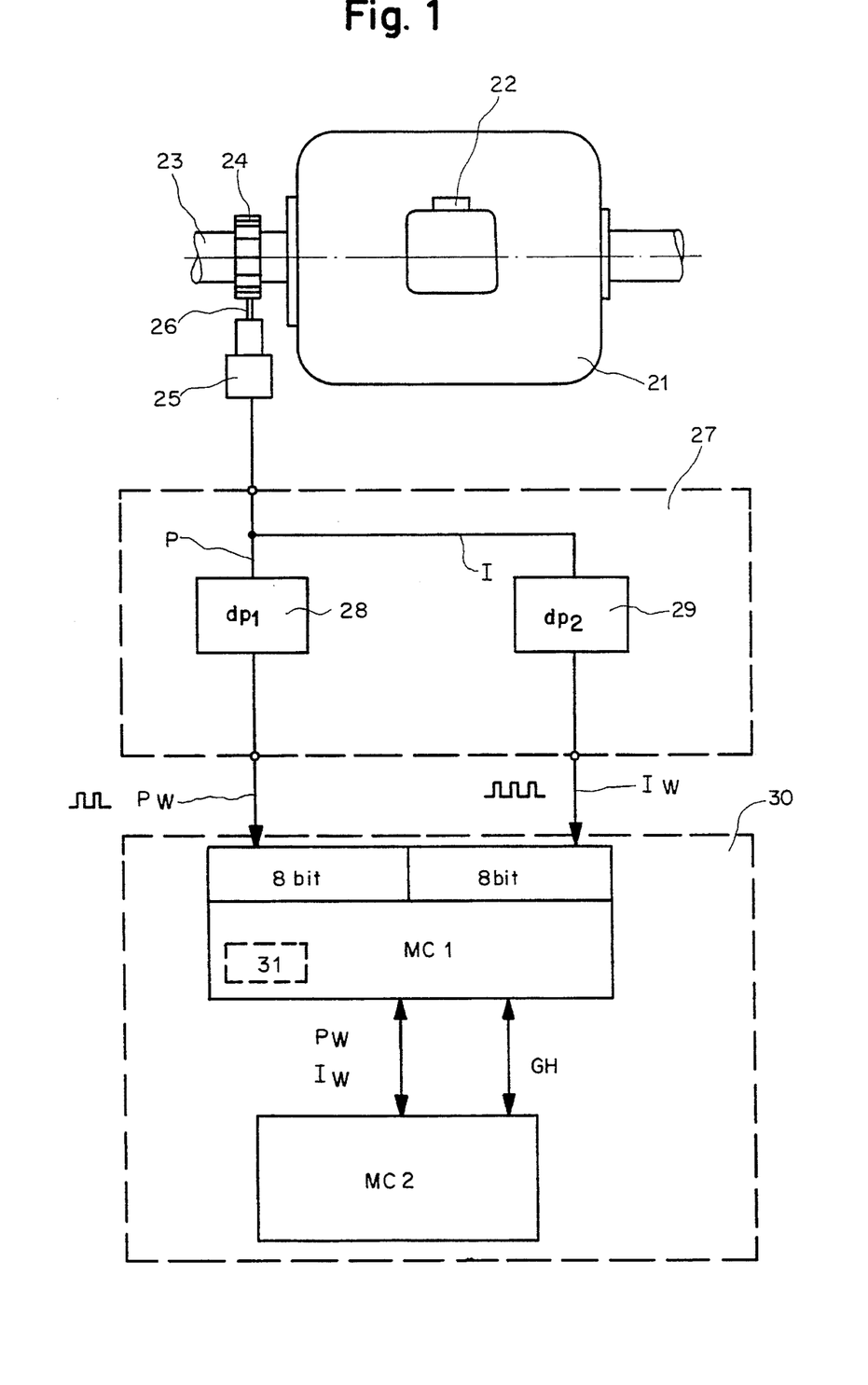
FIG. 1 shows a schematic diagram of an embodiment of the invention.

According to FIG. 1, the ACTUAL values of the rotational speed of an electric drive aggregate 21 are determined. This drive aggregate 21 may be a 35 V d.c. motor to which drive energy is fed via a wire which is not shown here and which leads to the terminal box 22. A ring 24 equipped with blades is located on shaft 23. The rotational speed of the shaft 23 can be ascertained by ACTUAL-value sensor 25 which scans the blades of ring 24 with scanner ray 26. ACTUAL-value sensor 25 produces pulse-shaped signals as it senses either the darker blades or the lighter segments between them. A pulse of constant pulse width is produced as a "lightness signal" for each transition from light to dark or vice versa. The optical scanning signals produced are then differentiated. The frequency of the pulses of constant pulse width per unit time is a measure of the appertaining rotational speed of the shaft 23.

Certain data processing aggregates such as the data processing aggregate 28 (dp1) which includes a counter Td (see FIG. 2) and is located in the signal path P, are interposed in the path from the ACTUAL-value sensor 25 to the evaluating unit 30. If the data processing aggregate 28 does not carry out its function fully, an "error" could possibly be detected in the evaluating unit 30, even though everything is otherwise in good order, and this could have negative consequences. In order to avoid such disadvantages without having to use additional monitoring arrangements for the data processing aggregate 28 itself, an additional signal path I is provided parallel to the signal path P. An additional data processing aggregate 29 (dp2) is located in this additional parallel signal path I, but its design is different from that of the first data processing aggregate 28. The data and information transmitted along the additional signal path I are processed differently from that on the first signal path P or are influenced in some other manner, this being possible, for instance, through a time offset by means of a running time link, so that transient failure or even merely weakening of one of the two signal groups running over the parallel signal paths P and I would make it possible to recognize a transient failure. Outwardly, this additional parallel signal path I with the additional data processing aggregate 29 which is of different design from the first data processing aggregate 28 cannot be seen. This is because both are built into the data conversion device 27 which is the connecting link between the ACTUAL-value sensor 25 and the evaluating unit 30 having the microcomputer MC1. The data Pw, Iw are transmitted via 8-bit inputs to the microcomputer MC1. There the data Pw, Iw, i.e., the data derived from the ACTUAL values, are compared with each other. If they are identical, a comparison is made with the DESIRED value in a comparator (COMP). In case of deviation, the drive aggregate is readjusted. The DESIRED value maybe stored in a DESIRED value memory 31. The ACTUAL value of the rotational speed of shaft 23 as well as deviations from the DESIRED value can be displayed in a display unit (not shown) connected to the evaluating unit 30. It is preferred that the digital signals Pw and the digital signals Iw also be conveyed to an additional microcomputer MC2 which compares the two digital signals Pw, Iw independently of the first microcomputer MC1.

Figure 2:
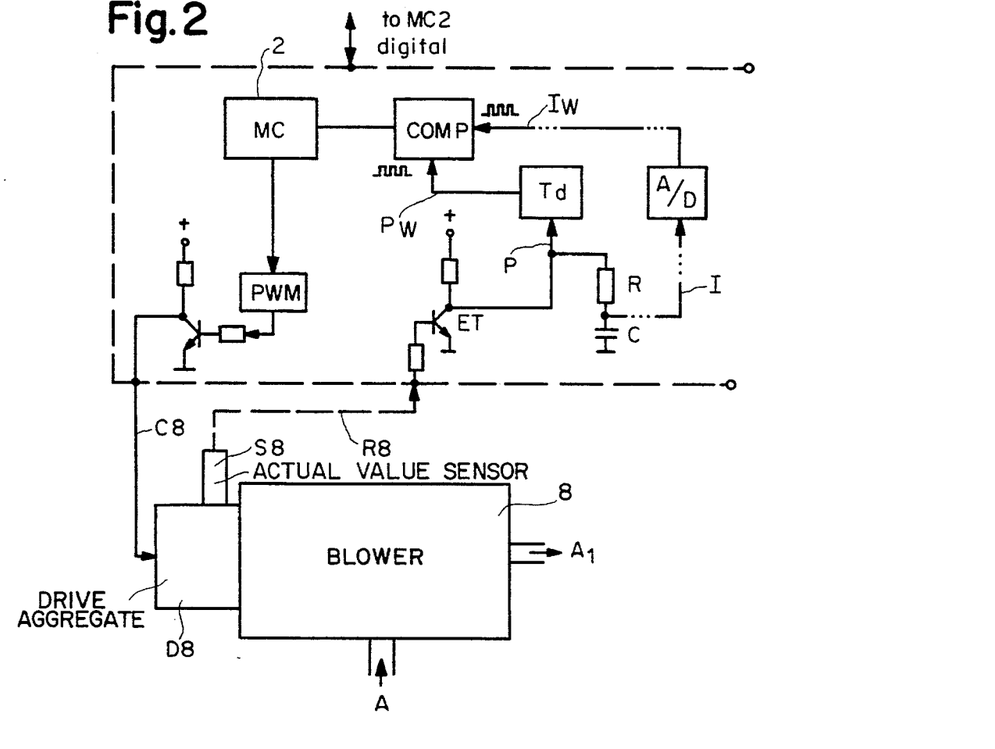
FIG. 2 shows a schematic circuit diagram for the distribution and separate processing of signals obtained by ACTUAL-value sensors.

In the preferred embodiment according to FIG. 2, it is shown how the microcomputer MC controls a signal generator PWM emitting pulse-width modulated control signals. Via control wire C8, these control signals determine the rotational speed of the drive aggregate D8 for the blower 8 of a burner of a heating plant which increases the pressure of the intake air A to the pressure of the delivered air $A_1$. At the same time, the sensor S8 which is used here as an ACTUAL-value sensor 25 (according to FIG. 1) ascertains the actual rotational speed of the drive aggregate D8. The digital signals which are produced by Hall probes in sensor S8 are fed back to the control aggregate 2 via return wire R8 and are there divided into two separate signal paths P and I after the input transistor ET. The digital signal path P leads to a timer or counter Td whose output is connected to one input of a standard comparator COMP.

An RC section branches off from the digital signal path, its task being, in the case where two drive motors are used, to convert the digital signals $P_1$, $P_2$ into analog signals $I_1$, $I_2$ and to feed these via the analog signal path I to an analog-to-digital converter A/D from which digital signals are in turn transmitted to the other input of comparator COMP, whose output is connected to the microcomputer MC. In the case where only one drive motor is used, as shown in FIG. 2, only one digital signal P and one analog signal I is used.

Referring to FIG. 2, the output of counter Td (signal Pw) and the output of the A/D converter (signal Iw) are measured and compared with each other in the comparator circuit (COMP) to ascertain deviations from each other. The resultant output from the comparator is inputted to the control aggregate MC for appropriate action.

Figure 3A:
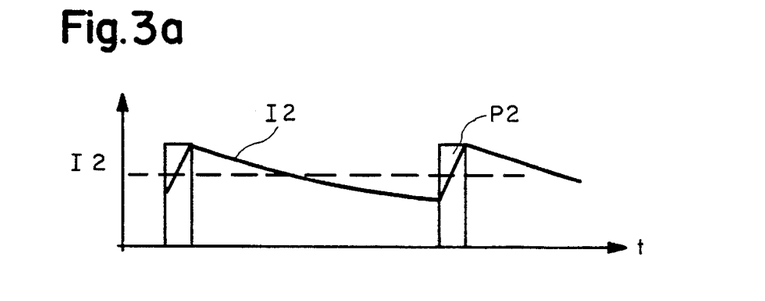
FIGS. 3a–3b show a representation of two different kinds of signals as a function of time.
Figure 3B:
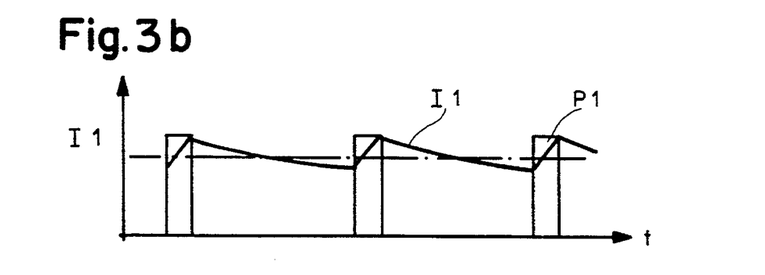

These digital signals $P_1$, $P_2$ and the integrated analog signals $I_1$, $I_2$ are shown schematically in FIGS. 3a and 3b.

Figure 4:
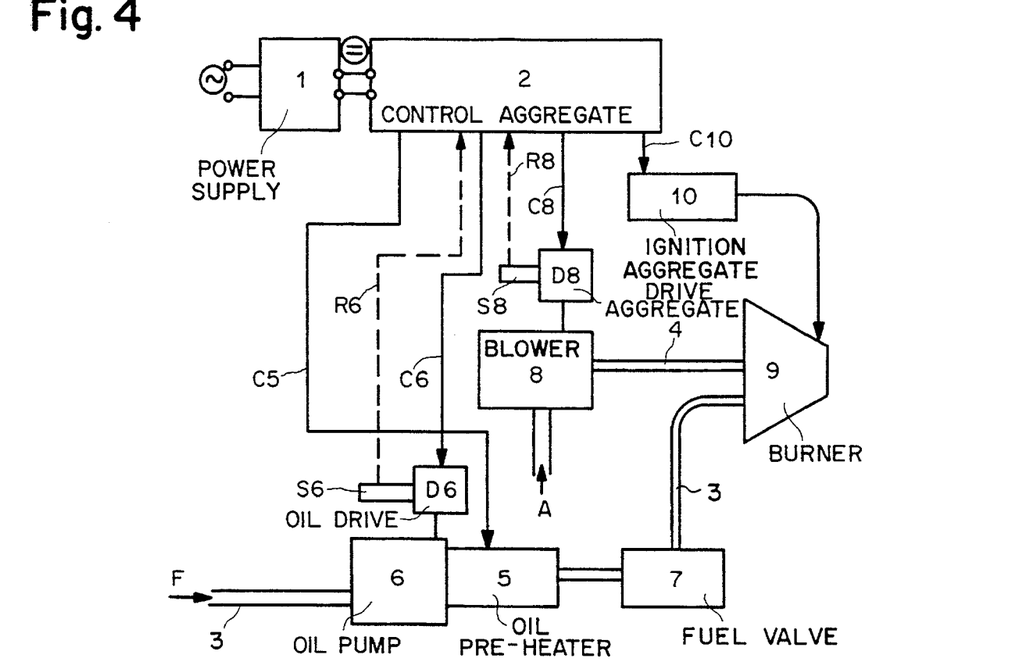
FIG. 4 shows a schematic diagram of a control system of a heating plant in which the invention can be used to advantage.
Figure 5A:
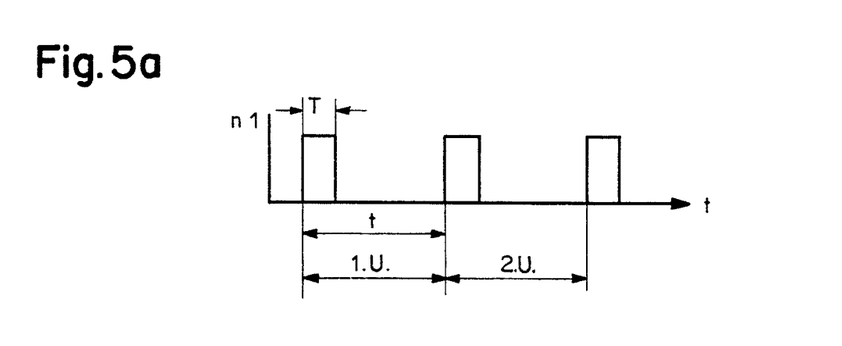
FIGS. 5a–5b show two diagrams for digital rotational speed ACTUAL-value processing.
Figure 5B:
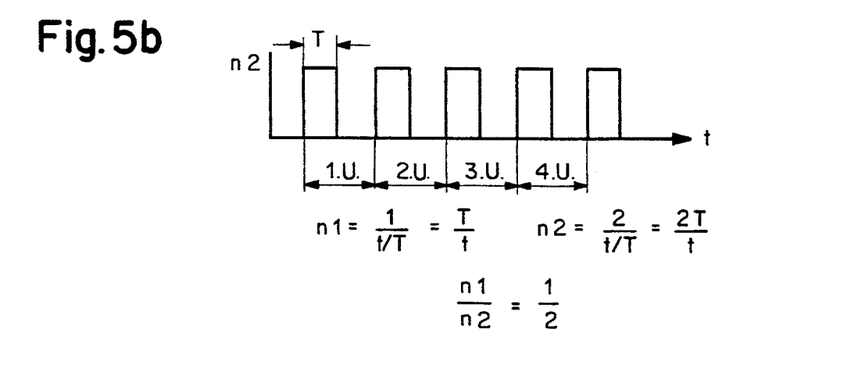

This division of the signal path into two separate and different signal paths P on the one hand and I on the other hand is also used correspondingly in the embodiment shown in FIG. 4 for the ACTUAL value signals coming from an additional sensor S6 associated with the oil pump. The signals from sensor S6 are transmitted to the control aggregate 2 via return wire R6.

According to FIG. 4, a 230 V a.c. network current in the power supply 1 is stepped down to 35 V low voltage and is rectified to an a.c. voltage. The power supply 1 is correspondingly equipped with, e.g., a 50 VA transformer in the power pack as well as with a rectifier. If necessary, the control aggregate 2 is supplied by the power supply 1 via intermediate pickups. The oil supply line 3 of the heating plant through which oil is conveyed as the fuel F, leads, as does the air circuit 4 for combustion air A, to the burner 9. Inserted in the oil supply line 3 are first the oil pump 6, then the oil pre-heater 5, followed by the fuel valve 7, while the blower 8 is inserted in the air supply circuit 4. The oil pump 6 as well as the blower 8 are equipped with their own drive aggregates D6 and D8, which in the illustrated embodiment are 35 V d.c. motors. These are controlled and supplied with voltage by the control aggregate 2 via control wires C6 and C8, while a control wire C5 goes from the control aggregate 2 to the oil pre-heater 5. Finally, another control wire C10 goes from the control aggregate 2 to the ignition aggregate 10 which serves to ignite the spray of oil and air mixture emerging from the burner 9 at a predetermined point in time in order to initiate combustion.

Each of the drive aggregates D6 and D8 is equipped with an ACTUAL-value sensor S6 or S8, e.g., in the form of Hall probes which emit pulses of constant pulse width and whose task it is to determine the respective rotational speeds of the drive motors D6, D8. Via return wires R6 and R8, these ACTUAL value signals are conveyed to the control aggregate 2 and are there processed for monitoring and/or regulation according to the invention.

It should be understood that storage elements and electrical or electronic components which carry out control functions as a function of various parameters, such as boiler water temperature, flow temperature, and/or return flow temperature of the heating plant, room temperature of the room to be heated, outside temperature, etc., may be installed in the control aggregate 2 together with microcomputer MC1. These control tasks may be carried out by increasing or decreasing the rotational speed of the blower 8 or of the oil pump 6, or by resetting them to zero, i.e., by shutting off the drive aggregate concerned entirely, in appropriate circumstances.

Through FIGS. 5a–5b and 6a–6b the different signal processes are explained schematically. In these drawings, $n_1$ designates the ACTUAL rotational speed of the drive aggregate D6 of the oil pump 6 and $n_2$ designates the ACTUAL value of the rotational speed of the drive aggregate D8 of the aerator or blower 8 of FIG. 4. The rotational speeds are detected through the ACTUAL-value sensors S6 and S8 which may be in the form of Hall probes. They deliver a pulse pattern (with pulses having a constant pulse width T), e.g., for the rotational speed $n_1$ as in FIG. 5a and for the rotational speed $n_2$ as in FIG. 5b, which correspond to a rotational speed ratio of 1:2. From this it clearly appears that the rotational speed $n_1$ is lower than the rotational speed $n_2$, since fewer pulses are produced per unit time t/T in FIG. 5a than in the case of FIG. 5b. The digital pulses can be counted in the digital counter Td over a certain period of time which is determined by a pulse generator or timer. They can then be compared with stored values in order to indicate the ACTUAL rotational speeds.

Figure 6A:
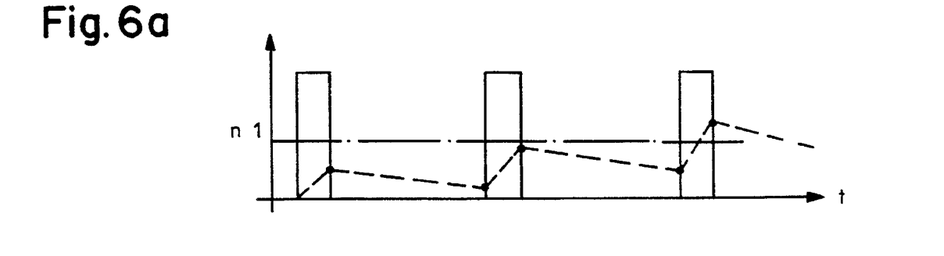
FIGS. 6a–6b show two diagrams for analog rotational speed ACTUAL-value processing.
Figure 6B:
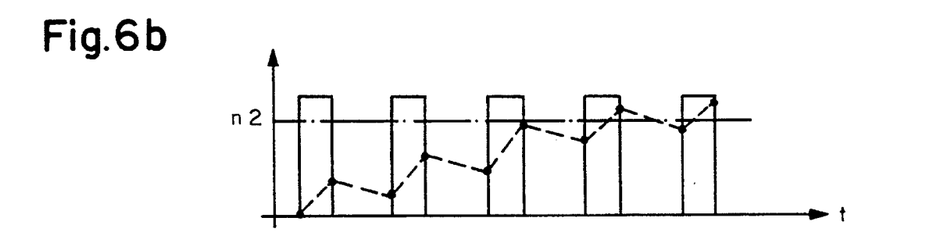

In FIGS. 6a and 6b, pulses are indicated by solid lines as corresponding pulse patterns. The signal path I which is parallel to the digital signal path P however carries out an integrating processing by means of a capacitor and this processing, in this rough example, starts after stoppage of the drive, since the output value of the differentiated analog signal is then zero. With each pulse, some overcharging takes place, so that after a certain number of pulses and overcharges, an analog value results for the rotational speed $n_1$ according to FIG. 6a and for rotational speed $n_2$ according to FIG. 6b. The almost constant value (indicated by dot-and-dash lines) which then applies can be compared to a DESIRED value by means of a comparator, e.g., by an operational amplifier. In that case, this DESIRED value could be derived from the signal of the pulse-width modulator PWM by means of an RC section, for example.

If transient error pulses occur as disturbances, these are also fully counted in the digital processing and would yield erroneous values, while they remain suppressed in the analog process.

Disturbance pulses such as occur in public power supplies, e.g., due to poorly shielded phase controls, generally have a distinctly smaller pulse width than the useful pulses of the ACTUAL-value sensors S6 and S8. For this reason, the effects of such interference pulses are different in the analog and in the digital branch of the monitoring systems. Therefore, different results in the measurement of rotational speed are obtained in the two branches, and this is recognized by the control aggregate 2.

Figure 7A:
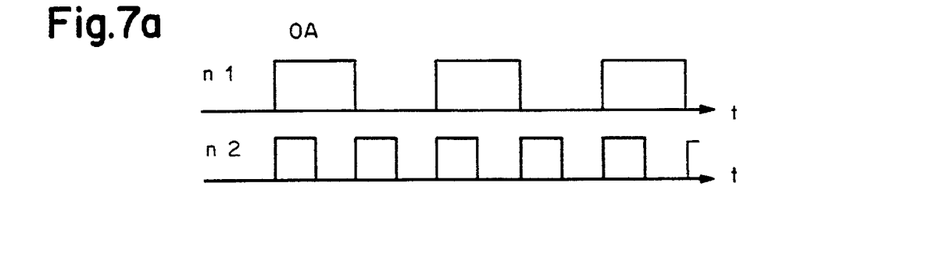
FIGS. 7a–7c show idealized signal diagrams.
Figure 7B:
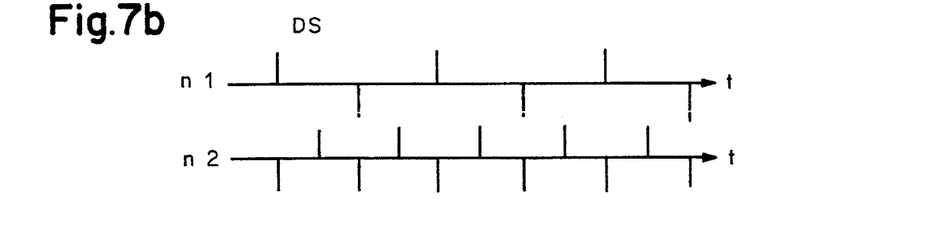
Figure 7C:
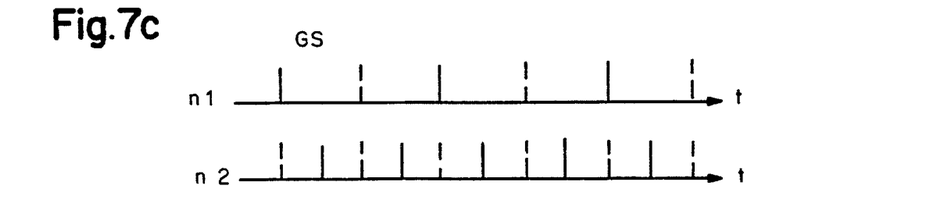

According to FIG. 7a, rectangular (idealized) signals OA are produced by an optical sensor for light zones and gaps are produced for dark zones for the two rotational speeds $n_1$ and $n_2$. According to FIG. 7b, the rectangular signals OA of the optical sensor are differentiated to produce differentiated signals DS. Insofar as the negative pulses are not blocked, a rectification according to FIG. 7c to produce rectified signals GS is required, these signals constituting after integration a measure of the rotational speeds $n_1$ and $n_2$ in the form of analog signals.

Figure 8A:
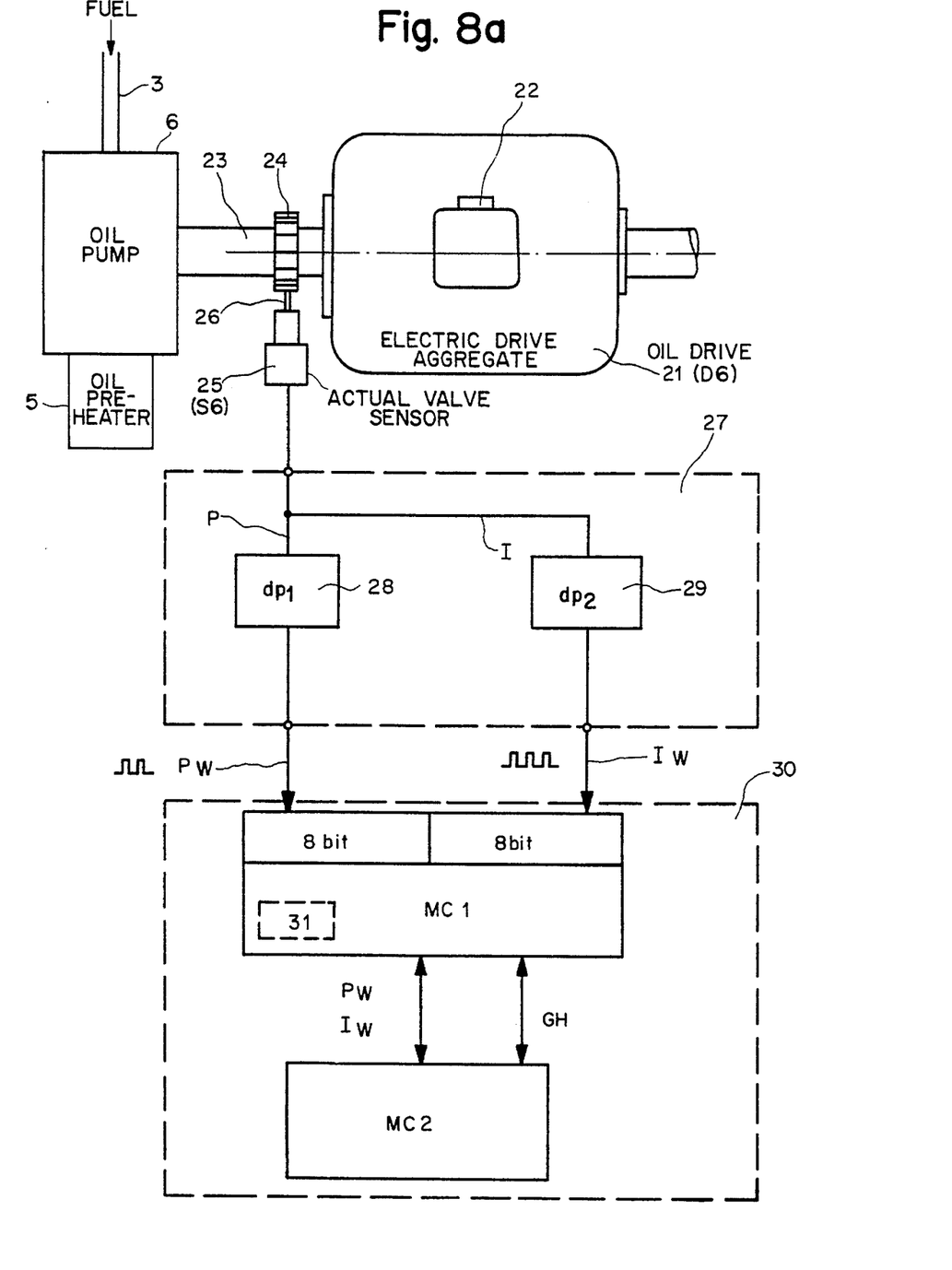
FIG. 8a shows an embodiment of the invention for an oil pump.

The relationship of oil pump 6 in FIG. 4 to the embodiment of the invention shown in FIG. 1 is illustrated by FIG. 8a. In this case, oil drive D6 (FIG. 4) is equivalent to electric drive aggregate 21 (FIG. 1), and actual value sensor S6 (FIG. 4) is equivalent to actual value sensor 25 (FIG. 1).

Figure 8B:
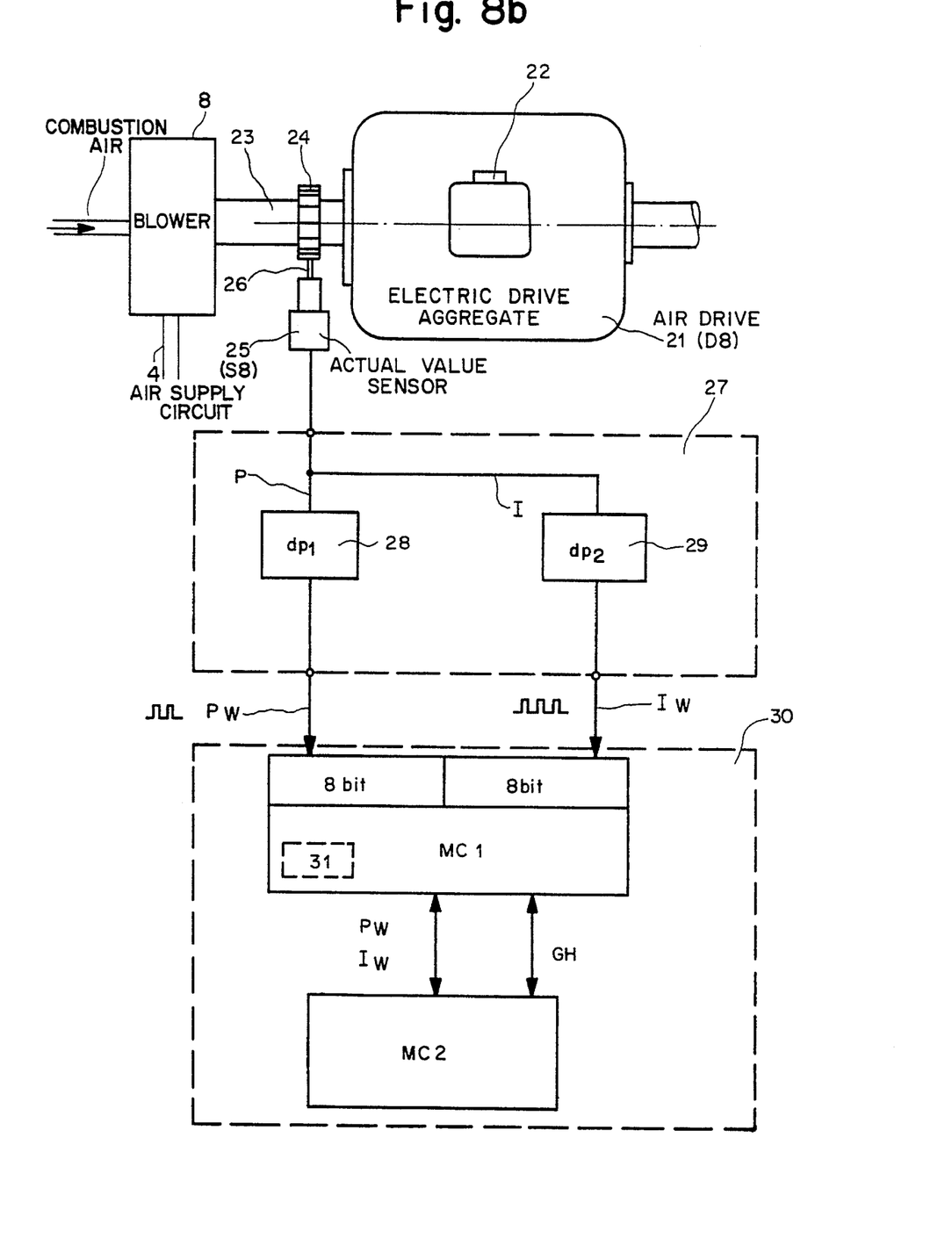
FIG. 8b shows an embodiment of the invention for an air blower.

Similarly, blower 8 in FIG. 4 is illustrated in FIG. 8b, where air drive D8 (FIG. 4) is equivalent to electric drive aggregate 21 (FIG. 1), and actual value sensor S8 (FIG. 4) is equivalent to actual value sensor 25 (FIG. 1).

The division into a signal path P for digital signal processing and a signal path I for analog signal processing also produces further advantages in additional embodiments of the invention. Insofar as different values for the rotational speed result from the different signal processing along these two signal paths P and I, the values can be compared to each other to determine a "true" or a defective value, and/or whether or not to institute a safety control measure.

In particular, an emergency shut-down may be carried out as will be shown further below.

In principle, it is not possible to clearly determine among different values which value is the correct, i.e., the "true" value. If one of the values is accepted as true, and the burner continues to function, the other signal path could also malfunction and this would result in the following errors:

a) The value of the first defective signal path is accepted as "true": the microprocessor readjusts the rotational speed of the motor, and this results in an inadmissible combustion mixture. In case of further failure of the second, previously error-free signal path, a reference to the ACTUAL rotational speed is no longer possible, since both channels are defective.

b) The value of the non-defective signal path is accepted as "true": The system functions correctly. However, if this signal path now also fails, then two defective signal paths exist. Since the possibility cannot be excluded that the two defective signal paths also deliver identical values, the danger exists that in this case the microprocessor adjusts the drive motor to the values of the defective signal paths, and this would in turn result in an inadmissible combustion mixture.

To eliminate these possibilities, the following is recommended:

Since digital signal processing paths react with greater sensitivity to brief, high-frequency interference signals and therefore lead more easily to erroneous values, the measured value of the analog signal path I is accepted as the "true" value when the digital signal path shows a higher rotational speed value.

If one of the two signal paths shows a measured value "zero", which should signify a stoppage of the drive aggregate, while the other signal path shows a value other than zero, this is understood to be a sign of a defect in this signal path. An emergency shut-down would be initiated in any case if the signal "zero" appears in the digital signal path.

If a difference is found between the rotational speed values for the blower drive, the lower rotational speed value is basically accepted as the true value, even if one of the rotational values is zero. The automatic furnace then tries to increase the rotational speed of the blower.

If, on the other hand, a difference between the rotational speed values of the two signal paths is found with the oil pump drive, the higher rotational speed value is advantageously assumed to be the true value.

In this manner, a safety measure is carried out in both instances, i.e., an increase of air relative to fuel and therefore the formation of toxic exhaust gases and a possible explosive mixture is avoided. A certain excess of air is therefore accepted.

If the values of one signal path are different from the value of the other parallel signal path, a certain reaction takes place therefore in accordance with relevant safety criteria.

While the invention has been described by reference to specific embodiments, this was for purposes of illustration only. Numerous alternative embodiments will be apparent to those skilled in the art and are considered to be within the scope of the invention.

We claim:

1. A monitoring system, comprising an actual value sensor which detects an actual value of a physical parameter of a component of an arrangement to be monitored and emits a signal in response thereto, a signal path connected to said actual value sensor which is divided into at least first and second parallel signal paths along which said signal emitted by said actual value sensor is processed simultaneously into first and second actual value signals, wherein said first signal path uses a first processing technique to generate said first actual value signal, and wherein said second signal path uses a second processing technique which is different from said first processing technique to generate said second actual value signal, and an evaluating unit connected to said first and second signal paths which receives and evaluates said first and second actual value signals, wherein said first and second actual value signals are compared with each other, to ascertain deviations between said first and second actual value signals.

2. The monitoring system of claim 1 wherein said actual value of a physical parameter of a component is the rotational speed of said component.

3. The monitoring system of claim 2 wherein said evaluating unit includes a comparator circuit for measuring and comparing said first and second actual value signals.

4. The monitoring system of claim 3 wherein said first processing technique uses digital signal processing, and said second processing technique uses analog signal processing.

5. The monitoring system of claim 4 further comprising a counter along said first signal path for digitally counting said digital first actual value signals, and an analog-to-digital converter along said second signal path or converting said analog second actual value signals into digital signals, wherein a digital output signal from each of said counter and said analog-to-digital converter is inputted to said comparator circuit.

6. The monitoring system of claim 5 further comprising an RC section branching off from said first signal path which receives said digital first actual value signals from said first signal path and converts them into said analog second actual value signals for said second signal path.

7. The monitoring system of claim 4 wherein said actual value sensor comprises an optical scanner which scans a ring having light and dark areas of equal width and which rotates with said component to be monitored, said signals emitted by said actual value sensor being differentiated so that a pulse of constant width is produced for each transition of light and dark areas.

8. The monitoring system of claim 4 wherein said actual value sensor is a Hall probe.

9. The monitoring system of claim 4 further comprising means for evaluating said rotational speed of said component represented by said analog second actual value signals from said second signal path as said actual value of said rotational speed if said rotational speed of said component represented by said digital first actual value signals from said first signal path is higher than said rotational speed of said component represented by said analog second actual value signals.

10. The monitoring system of claim 4 further comprising means for initiating an emergency shut down of said component if the difference between said rotational speed represented by said digital first actual value signals and said rotational speed represented by said analog second actual value signals exceeds a predetermined value.

11. The monitoring system of claim 4 further comprising means for initiating an emergency shut down of said component if the rotational speed value transmitted by one of said first and second signal paths is zero, while the rotational speed value transmitted by the other of said first and second signal paths is not zero.

12. The monitoring system of claim 1 wherein said component is a drive aggregate and said physical parameter is the rotational speed of the drive aggregate.

13. A monitoring system for a burner having a blower which supplies air to said burner and having a fuel pump which supplies fuel to said burner, comprising a first actual value sensor which detects a rotational speed of a first drive aggregate which drives said blower and emits a signal in response thereto, and a second actual value sensor which detects a rotational speed of a second drive aggregate which drives said fuel pump and emits a signal in response thereto, a first signal path connected to said first actual value sensor associated with said blower and a second signal path connected to said second actual value sensor associated with said fuel pump, each of said first and second signal paths being divided into respective first and second parallel actual value signal paths, means disposed along each of said first actual value signal paths for digital signal processing of each of the signal emitted by the first actual value sensor and the signal emitted by the second actual value sensor, and means disposed along each of said second actual value signal paths for analog signal processing of the signal emitted by the first actual value sensor and the signal emitted by the second actual value sensor, and an evaluating unit connected to each of said first and second parallel actual value signal paths, said evaluating unit receiving and comparing said digital and analog processed signals carried on each of said first and second parallel actual value signal paths.

14. The monitoring system of claim 13 further comprising means for evaluating the lower value of said digital and analog processed signals as the actual value of the rotational speed of said blower in case of a difference between said digital and analog processed signals carried along said first and second parallel actual value signal paths connected to said first actual value sensor.

15. The monitoring system of claim 14 further comprising means for evaluating the higher value of said digital and analog processed signals as the actual value of the rotational speed of said fuel pump in case of a difference between said digital and analog processed signals carried along said first and second parallel actual value signal paths connected to said second actual value sensor.

* * * * *